Nov. 22, 1955  C. F. VAN BENNEKOM  2,724,794
INDICATOR
Filed March 19, 1952
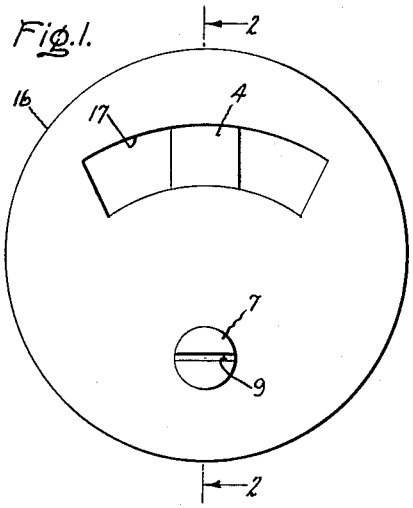
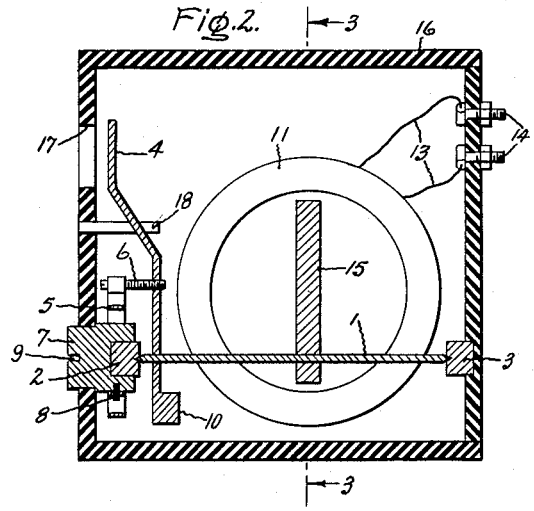
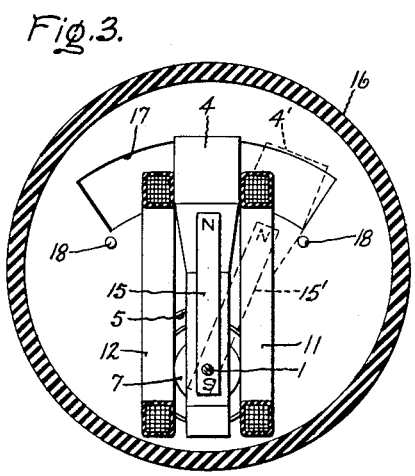
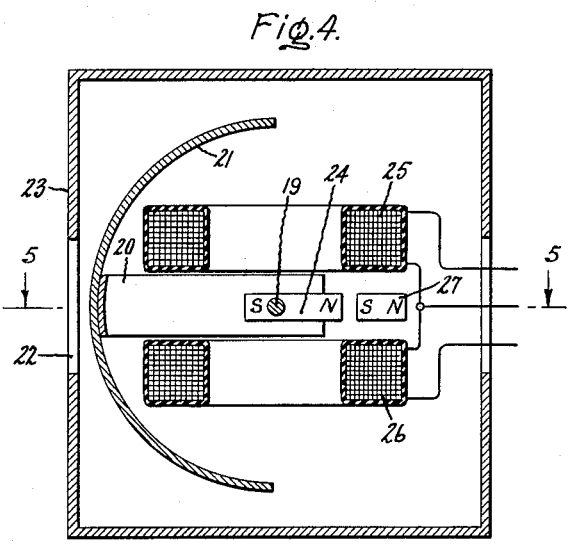
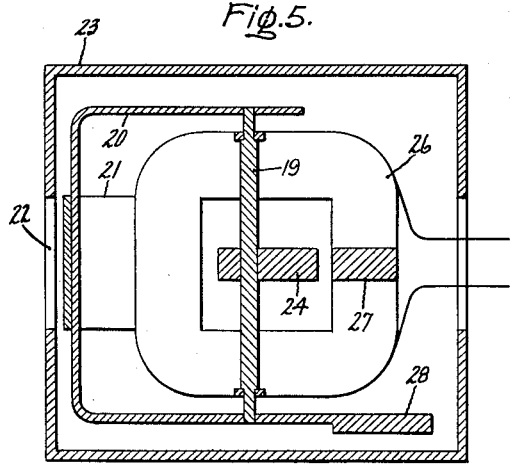
Inventor:
Carl F. Van Bennekom,
by Richard E. Hosley
His Attorney.

United States Patent Office 2,724,794
Patented Nov. 22, 1955

2,724,794
INDICATOR

Carl F. Van Bennekom, Lynnfield, Mass., assignor to General Electric Company, a corporation of New York Application March 19, 1952, Serial No. 277,435

2 Claims. (Cl. 317—171)

My invention relates to improvements in electrically operated indicators which indicate by changes in the position of a small flag the presence of electric current in either of two circuits which may be selectively energized, and its principal object is to provide greater sensitivity and reliability in such indicators. Other objects and advantages will appear as the description proceeds.

Such indicators may be used, as one example, in an aircraft instrument system to indicate information useful to the pilot, such as the position of the retractable landing gear of the airplane. Electrical contacts may be arranged in the landing gear to energize one electrical circuit when the landing gear is in its fully retracted position, whereupon the indicator flag is moved automatically to one side to indicate this information to the pilot. Other contacts may be arranged to energize another circuit when the gear is fully extended for landing, whereupon the flag is moved automatically to the other side. When neither circuit is energized, the flag assumes a neutral position which indicates to the pilot that the gear is in an intermediate position, or that the indicator system is not functioning. Since a considerable number of indicators, as well as other equipment, may be needed in a single instrumentation system, it is desirable that the indicators be sensitive to small electric currents, and be small in size. It is imperative that they be rugged and reliable.

Briefly stated, in accordance with one aspect of my invention, a flag is attached to and rotatable with a shaft to indicate its angular position. A permanent bar magnet is also attached to and rotatable with the shaft. When the shaft is in a neutral position, established by suitable biasing means, the magnet extends substantially midway between and parallel to two coils located on opposite sides of the shaft; in other words, the magnet is perpendicular to the common axis of the coils. When either coil is energized by an electric current, the magnet tends to rotate toward a position parallel with the coil axis. This rotates the shaft away from its neutral position, and moves the flag to one side or the other, selectively, depending upon which of the two coils is energized.

An important feature of my improved indicator is that the magnet is eccentrically mounted upon the shaft; that is, the shaft is off center with respect to the magnet, so that one end of the magnet extends outward from the shaft further than the other end. The longer end of the magnet moves toward the center of the energized coil, and thus passes into a region of greater magnetic flux density than would be the case if the magnet were centered on the shaft. By mounting the magnet eccentrically in this manner, I can increase the torque transmitted to the shaft by as much as 50%, while using otherwise identical magnets, coils, and exciting currents. This means that the same torque can be obtained with less current, providing greater sensitivity, or more torque can be obtained with the same current, providing greater reliability. Furthermore, these advantages make it possible to design a more compact, rugged, and economical indicator for any desired degree of sensitivity and reliability.

My invention will be better understood from the following description taken in connection with the accompanying drawing, and its scope will be pointed out in the appended claims.

In the drawing, Fig. 1 is a front elevation of an improved indicator.

Fig. 2 is a section taken along line 2—2 of Fig. 1, Fig. 3 is a section taken generally along line 3—3 of Fig. 2, Fig. 4 is a section of another improved indicator, and Fig. 5 is a section taken generally along line 5—5 of Fig. 4.

Referring now to Figs. 1-3 of the drawing, a shaft 1 is rotatably supported by suitable bearings 2 and 3. A small flag 4 is attached to and rotatable with shaft 1 for indicating its angular position. A suitable biasing means is provided to bias shaft 1 to a neutral position, which may be the position in which flag 4 extends vertically upward from the shaft, as shown in the drawing. For example, the biasing means may comprise a spiral spring 5 connected at one of its ends to flag 4 by a pin 6, and connected at the other of its ends to a rotatable adjustment member 7 by a pin 8. Member 7 is made rotatable to permit adjustment of the neutral position. A slot 9 may be provided in member 7 as shown to facilitate this adjustment. It may also be noted that member 7 serves as a support for bearing 2.

Alternatively, in place of the spring 5, the biasing means may comprise a heavy or weighted portion 10 at the bottom of flag 4, so that gravity biases shaft 1 to its neutral position. If the instrument is to be operated in an inverted position to that shown in the drawing, the heavy or weighted portion of flag 4 would, of course, be at the other end. Spring biasing has the advantage that shaft 1 and its associated parts may be balanced with respect to the force of gravity, and the indicator can be operated satisfactorily in any position. Magnetic biasing means can also be employed, as in the embodiment illustrated by Figs. 4 and 5.

Two annular coils 11 and 12 are respectively positioned on opposite sides of shaft 1 substantially parallel thereto and parallel to each other, as shown. Electrical connections 13 and terminals 14 are provided for energizing coil 11. Similar connections and terminals, not shown, are provided for energizing coil 12. In use, the indicator is connected in an electrical system such that the two coils are energized selectively according to the information to be indicated.

A permanent bar magnet 15 is eccentrically mounted upon shaft 1 and rotatable therewith. Although the poles of the magnet are conventionally indicated by the letters N and S in Fig. 3 of the drawing, it will be understood that the polarity may be reversed without affecting the principle of operation. When shaft 1 is in its neutral position, magnet 15 extends substantially midway between and parallel to coils 11 and 12, as shown by the solid lines in Fig. 3 of the drawing. When coil 11 is energized by passing an electric current therethrough, the longer end of magnet 15 is magnetically attracted toward the center of coil 11, and the magnet moves to the position 15', indicated by broken lines in Fig. 3 of the drawing. This rotates shaft 1 away from its neutral position, and thereby moves flag 4 to the position 4', also indicated by broken lines. Similarly, when coil 12 is energized, the longer end of magnet 15 is attracted toward the center of the energized coil, thereby rotating shaft 1 in the opposite direction and moving flag 4 to the other side. Whenever neither coil is energized, the biasing means returns the magnet, shaft and flag to the neutral position.

The indicator mechanism may be housed in a suitable case 16. A window 17 is provided in the front of the case in order that the position of flag 4 may be observed.

Stops 18 may be provided to limit the travel of flag 4 to the width of the window 17.

Referring now to Figs. 4 and 5, which illustrate another embodiment of my invention, a rotatable shaft 19 carries a U-shaped member 20 which supports a semi-circular flag 21 as shown. A portion of flag 21 is visible through window 22 in case 23. Different portions of the flag may be painted in different colors. For example, one end of the flag may be red, the center portion may be white and the other end may be green, so that the color seen through window 22 depends upon the angular position of shaft 19. Alternatively, or in addition, suitable legends may be printed upon the different portions of flag 21.

A permanent bar magnet 24 is eccentrically mounted on shaft 19 and is rotatable therewith. Coils 25 and 26 are positioned upon opposite sides of shaft 19, so that in the neutral position, shown in the drawing, a magnet 24 extends midway between and parallel to the two coils. Either coil may be energized selectively by passing an electric current therethrough, whereupon the longer end of magnet 24 is attracted toward the center of the energized coil. This rotates shaft 19 away from its neutral position and causes a differently colored portion of flag 21 to be visible through window 22.

To bias the permanent magnet 24, shaft 19 and flag 21 to the neutral position, a second permanent bar magnet 27 is fixed in position between coils 25 and 26, as shown. Magnets 24 and 27 are arranged so that, in the neutral position, the north pole of one is adjacent to the south pole of the other, and magnet 27 attracts magnet 24 to the neutral position whenever neither of the two coils is energized. However, when either coil 25 or coil 26 is energized, the action of the coil upon magnet 24 is sufficiently strong to overcome the attraction of magnet 27, and shaft 19 is rotated away from the neutral position.

A weighted portion 28 preferably is provided at the end of one leg of U-shaped member 20. Member 20, magnet 24, flag 21 and weighted portion 28 are balanced upon shaft 19 so that there is no tendency for gravity to rotate the assembly in any position.

What I claim as new and desire to secure by Letters Patent of the United States is:

1. An electrically operated device having a rotatable shaft for operating a signal, means for biasing said shaft to a neutral position, an actuating mechanism for said shaft comprising two coils respectively positioned on opposite sides of said shaft and substantially parallel thereto, said coils having aligned centrally disposed air cores, electrical connections for selectively and individually energizing said coils, and a permanent bar magnet eccentrically mounted on said shaft and rotatable therewith, said eccentric mounting dividing said magnet between its poles into a short section and a long section, said magnet extending substantially midway between and parallel to said two coils when said shaft is in its neutral position, whereby the long section of said magnet swings toward the center of either air core upon selective energization of one of said coils.

2. The combination defined by claim 1 wherein the means for biasing the shaft comprise a fixed permanent bar magnet rigidly mounted midway between said coils and parallel thereto and in end-to-end relationship with said eccentrically mounted magnet, said magnets having opposite polarity at their adjacent ends when said shaft is in said neutral position whereby said fixed magnet biases said shaft toward its neutral position.

References Cited in the file of this patent

UNITED STATES PATENTS

| | | |
|---|---|---|
| 698,027 | Knapp | Apr. 22, 1902 |
| 1,638,098 | Rochette | Aug. 9, 1927 |
| 2,156,012 | Doyle | Apr. 25, 1939 |
| 2,245,493 | Nothe | June 10, 1941 |
| 2,405,429 | Jewell | Aug. 6, 1946 |
| 2,415,452 | Taylor et al. | Feb. 11, 1947 |

FOREIGN PATENTS

| | | |
|---|---|---|
| 515,515 | Great Britain | Dec. 7, 1939 |